US005164568A

United States Patent [19]

Sanders

[11] Patent Number: 5,164,568

[45] Date of Patent: Nov. 17, 1992

[54] NOZZLE FOR A PLASMA ARC TORCH HAVING AN ANGLED INNER SURFACE TO FACILITATE AND CONTROL ARC IGNITION

[75] Inventor: Nicholas A. Sanders, Norwich, Vt.

[73] Assignee: Hypertherm, Inc., Hanover, N.H.

[21] Appl. No.: 826,653

[22] Filed: Jan. 21, 1992

Related U.S. Application Data

[63] Continuation of Ser. No. 424,675, Oct. 20, 1989, abandoned.

[51] Int. Cl.[5] .............. B23K 9/00

[52] U.S. Cl. .............. 219/121.5; 219/121.57; 219/121.48; 219/75

[58] Field of Search .............. 219/121.5, 121.48, 121.51, 219/121.52, 75, 121.59, 121.57; 313/231.21, 231.31

[56] References Cited

U.S. PATENT DOCUMENTS

| | | | |
|---|---|---|---|
| 3,082,314 | 3/1963 | Arata et al. . | |
| 3,131,288 | 4/1964 | Browning . | |
| 3,534,388 | 10/1970 | Ito et al. . | |
| 3,619,549 | 11/1971 | Hogan . | |
| 3,641,308 | 2/1972 | Couch, Jr. et al. . | |
| 3,787,247 | 1/1974 | Couch, Jr. . | |
| 3,833,787 | 9/1974 | Couch, Jr. . | |
| 3,914,573 | 10/1975 | Muehlberger | 219/121.5 |
| 4,203,022 | 5/1980 | Couch, Jr. et al. . | |
| 4,275,287 | 6/1981 | Hiratake . | |
| 4,282,418 | 8/1981 | Wuestner | 29/121.5 |
| 4,421,970 | 12/1983 | Couch, Jr. . | |
| 4,506,136 | 3/1985 | Smyth et al. | 219/121.5 |
| 4,626,648 | 12/1986 | Browning | 219/121.5 |
| 4,645,899 | 2/1987 | Bebber et al. | 219/121.5 |
| 4,782,210 | 9/1988 | Nelson et al. . | |
| 4,791,268 | 12/1988 | Sanders et al. . | |
| 4,861,962 | 8/1989 | Sanders et al. . | |
| 4,866,240 | 9/1989 | Webber . | |
| 4,882,465 | 11/1989 | Smith et al. | 219/121.5 |

*Primary Examiner*—Mark H. Paschall
*Attorney, Agent, or Firm*—Wolf, Greenfield & Sacks

[57] ABSTRACT

A plasma arc torch mounts an electrode and a nozzle, with a mutual spacing, symmetrically about a common longitudinal axis at one end of the torch adjacent a workpiece. The inner surface of the nozzle has an annular, inwardly-directed projection, located opposite the electrode and at a point of closest spacing between the electrode and the nozzle. The projection, or "angle kink", is characterized by a minimum radius of curvature as compared to the radii of curvature of adjacent portions of the nozzle opposite said electrode. The inner surface is adjacent a central exit passage of the nozzle and the angle kink is spaced from the intersection of the exit port and the inner nozzle. In the preferred form the interior nozzle surface is formed by two conical surfaces each having different slopes with respect to the longitudinal axis so as to form the circumferentially extending angle kink at their plane of intersection.

10 Claims, 2 Drawing Sheets

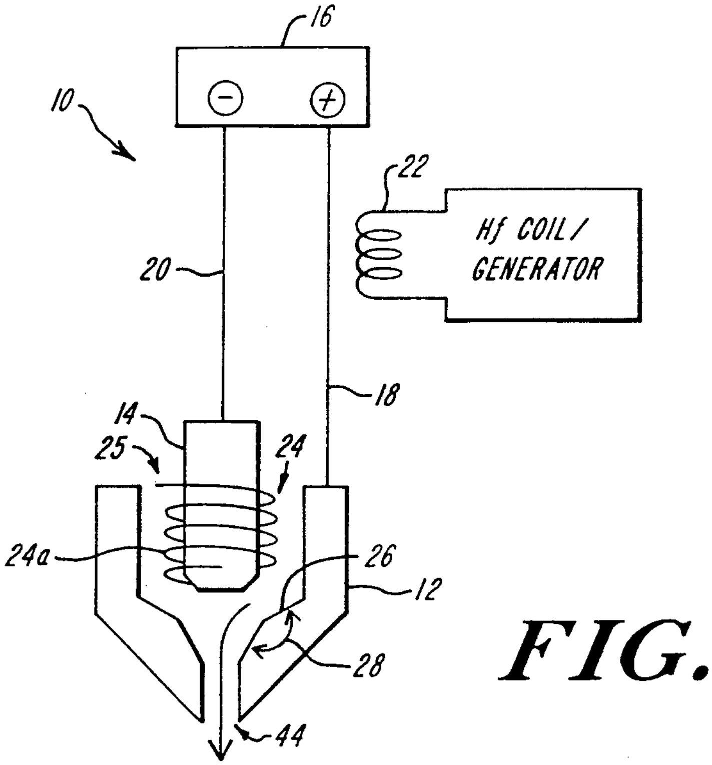
FIG. 1
FIG. 2
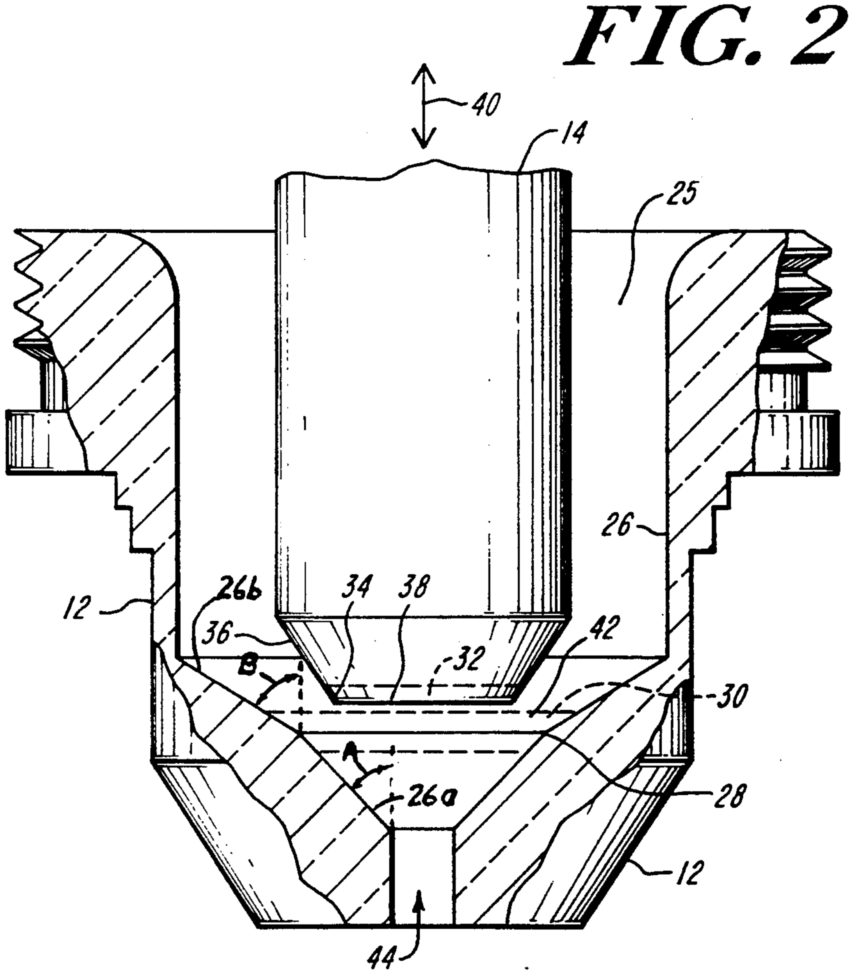

NOZZLE FOR A PLASMA ARC TORCH HAVING AN ANGLED INNER SURFACE TO FACILITATE AND CONTROL ARC IGNITION

This application is a continuation of application Ser. No. 07/424,675, filed Oct. 20, 1989, now abandoned.

BACKGROUND OF THE INVENTION

The present invention relates to plasma arc torches, and more particularly to an improved nozzle construction for initiating an arc in such torches utilizing a high voltage, high frequency signal applied to either an electrode or to the nozzle.

The starting of plasma torches has for a long time been a problem area in plasma torch development and the focus of much engineering attention.

There are currently three know methods to initiate a plasma arc discharge and start a plasma arc torch: 1) the high frequency discharge or its relative, the high voltage spark discharge, 2) contact starting, and 3) an exploding wire technique. In each method, an arc is drawn in an ionizable gas between a cathode (an electrode) and an anode (a nozzle or component of a nozzle).

The oldest, and most widely used method is the high frequency, high voltage spark discharge method. The high voltage, high frequency generates charge carriers which create an electrical current path in the gas in the gap between the cathode and the electrode to establish D.C. flow of current, a pilot arc discharge. It is common practice to attach the high frequency coil to the power supply line leading to the electrode or the nozzle, but on smaller systems having a lower power rating, e.g., those characterized by a DC amperage of 200 or less, the high frequency coil is usually coupled to the power line for the electrode.

An example of this high frequency, high voltage starting method is described in U.S. Pat. No. 3,641,308 to Couch, Jr., et al. A brief, high voltage pulse applied to the cathode initiates an arc across the gap to a nozzle which is connected through a switch and a resistor to ground. The workpiece is also grounded so that once the gas flow is initiated the arc will transfer from the nozzle to the workpiece. The switch is then opened so that the nozzle is electrically floating and the workpiece remains connected to ground. This general method of starting is also disclosed in U.S. Pat. Nos. 3,082,314 to Arata et al; 3,131,298 to Browning; 3,534,388 to Ito et al; 3,619,549 to Hogan et al; 3,787,247 to Couch, Jr.; 3,833,787 to Couch, Jr.; and 4,203,022 to Couch, Jr. et al.

In prior art plasma arc torches the electrode has traditionally had a generally cylindrical configuration, whether a cylindrical disk seated in a solid copper tube as described in the aforementioned U.S. Pat. Nos. 3,641,308, 4,203,022 or the electrode-nozzle arrangement shown and described in U.S. Pat. Nos. 4,421,970; 4,791,268; and 4,861,962. In these prior art arrangements, the lower end of the electrode adjacent the nozzle typically has a cylindrical configuration. The immediately opposite nozzle surface typically mirrors the outer configuration of the electrode, or is smooth, conical and downwardly converging. In both instances the nozzle includes a central exit port where the plasma arc exits the torch and attaches to the workpiece. It is significant that while the transition between the interior nozzle surface and the exit port may be a sharp corner, and while this corner may be closely spaced from the electrode, it is not located in a region where it is closer to the electrode than immediately adjacent portions of the nozzle.

There are two principal problems with the prior art designs. First, when the arc is initiated it is sometimes difficult to induce the breakdown of the gas to start the plasma arc discharge. To reliably reach the breakdown potential to initiate the arc, the voltage level applied to the electrode is increased. This, however, accentuates the electromagnetic noise interference problems associated with all high-frequency, high-voltage starting arrangements.

Another quite significant problem is the lack of reliability as to where on the electrode and nozzle the arc will initiate. This lack of control over the location of the arc causes wear problems. For example, if the high frequency spark begins high on the side of the electrode (away from the exit port), by the time it travels to the lower portion of the electrode, typically containing an electron emitting element, the DC current and voltage levels can be ramped up to a level such that double arcing occurs. As is well known in the trade, double arcing will quickly destroy torch components such as the nozzle and the electrode.

In the prior art it is known to machine mark the electrode to facilitate breakdown of the gas at the mark on start up. However, to the best of applicant's knowledge, there has been no nozzle structure specifically designed to reduce the breakdown potential (and the elapsed time required to achieve breakdown) and to control the location of where the pilot arc is initiated by applying a high frequency, high voltage to either the nozzle or the electrode. This is particularly true where the high voltage, high frequency coil is attached to the power line leading to the nozzle, not the electrode. In this situation with prior art constructions, variations in the external configuration of the electrode would have little or no effect on the location of the arc.

It is therefore a principal object of the present invention to provide a nozzle construction or a plasma arc torch which reliably initiates an arc within a small, well-defined annular region of the electrode and the nozzle.

Another principal object is to reduce electrode wear as compared to comparable prior art nozzles in comparable torches operated under the same conditions.

Yet another principal object of this invention is to reduce the breakdown potential required to initiate an arc discharge in a given plasma arc torch.

A further object in the present invention is to provide a nozzle construction which reduces electromagnetic interference during the high frequency, high voltage start up with other electrical and electronic components in the operating area.

A still further of the present invention is to provide a nozzle construction with the foregoing advantages which is simple in construction, has a comparatively low cost of manufacture, and can be used as a replacement part for conventional nozzles of existing plasma arc torches.

SUMMARY OF THE INVENTION

A plasma arc torch includes an electrode and a nozzle mounted in a mutually spaced relationship at one end of the torch adjacent a workpiece. They are also mounted symmetrically with respect to the torch and each other about a common longitudinal axis. A flow of an ionizable gas passes through the torch and exits a central exit port in the nozzle which is aligned opposite the lower end of the electrode. A DC power supply is attached to the electrode and the nozzle and a high frequency, high voltage coil/generator is electromagnetically coupled to either the negative or positive output of the DC power supply.

The nozzle, which is typically cup-shaped, receives the electrode within the nozzle with a generally uniform spacing between the electrode in the opposite surfaces of the nozzle. The interior surface of the nozzle facing the electrode has a convex, inwardly projecting, circumferentially extending solid angle or "angle kink" portion. This angle kink is characterized by a minimum radius of curvature (whether a sharp corner, a rounded corner, or even some more complex cross-sectional shape) for a narrow annular region of this surface immediately opposite to the electrode and adjacent the central exit port of the nozzle. This annular region defines the location of preferential initiation of the plasma arc discharge. This kink angle is located at the closest approach between the electrode and the nozzle, and is displaced from the angle formed by the intersection of the central exit port in the nozzle and the interior surface of the nozzle.

In a preferred form, the angle kink is formed by the intersection of two conical surfaces having different angles of inclination with respect to the longitudinal axis. Comparatively flat angle kinks, e.g. one with an included angle of about 165° are effective. The electrode also has an outwardly projecting angle kink formed by the cylindrical side surface, or a conical transition surface of the lower end of the electrode, and a planar end face oriented perpendicular to the longitudinal axis. The electrode angle kink is also located at the point of closest approach between the electrode and the nozzle and it opposes the angle kink on the nozzle. The electrode and nozzle angle kinks are centered in circumferentially extending annular regions. Because of the minimum radius of the angle kink and the fact that the angle kink are located at local points of closest approach of the electrode and nozzle, 1) the electric field induced by the high voltage, high frequency starting signal is enhanced and 2) there is a reliable and rapid breakdown of the plasma at this region in preference to other locations on the electrode or nozzle.

These and further features and objects of the present invention will be more readily understood from the following detailed disclosure of the preferred embodiments which should be read in light of the accompanying drawings.

BRIEF DESCRIPTION OF THE DRAWINGS

FIG. 1 is a simplified schematic view of a high frequency, high voltage plasma arc initiation system according to the present invention;

FIG. 2 is a detail view in side elevation partially in vertical section of the lower portion of the electrode and the nozzle shown in FIG. 1;

DETAILED DESCRIPTION OF THE PREFERRED EMBODIMENTS

Figure 3:
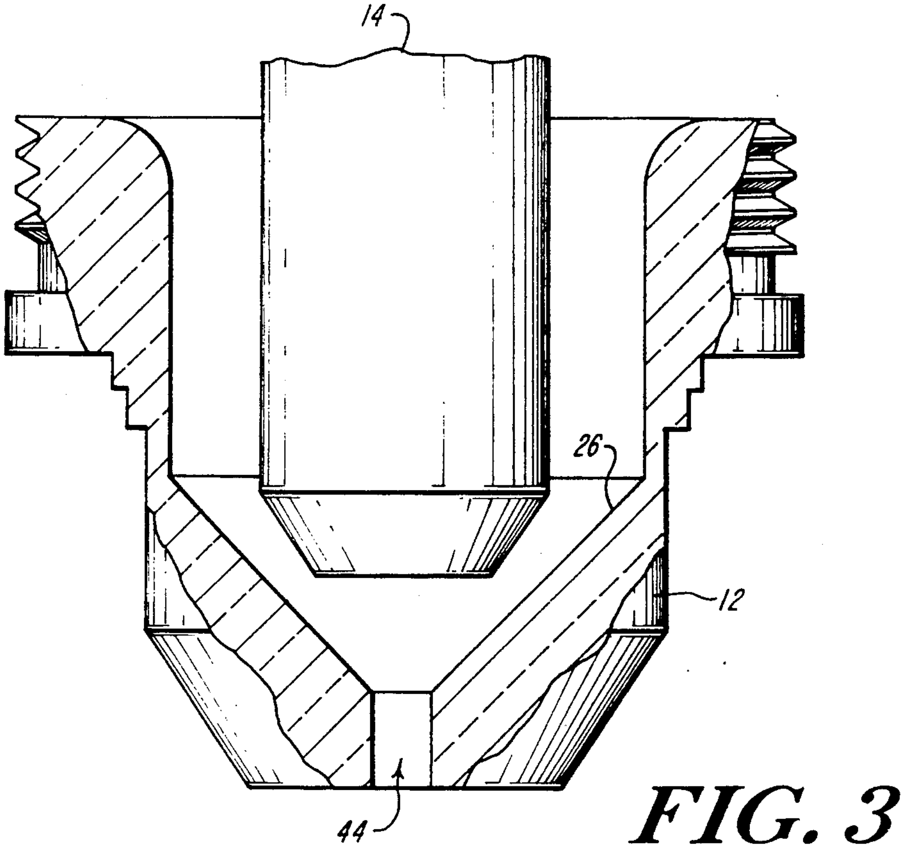
FIG. 3 PRIOR ART
FIG. 3 is a view corresponding to FIG. 2 showing a prior art nozzle construction utilizing a smooth conical interior nozzle surface.

With reference to FIG. 1, a plasma arc torch 10 having a nozzle 12 and an electrode 14 is connected to a DC power supply 16. As shown, the positive output of the power supply 16 is connected by lead 18 to the nozzle 12 and the negative side of the power supply 16 is connected by lead 20 to the electrode 14. The plasma arc torch 10 can be any of a wide variety of currently available torch designs in the prior art. Suitable constructions are shown, example, in the aforementioned U.S. Pat. Nos. 3,641,308; 4,203,022; 4,791,268; and 4,861,962. A high-frequency coil 22 can be coupled electromagnetically to either the positive lead 18, as shown, or the negative lead 20. The high-frequency coil/generator produces a high-voltage, high-frequency signal which is transmitted over the lead to the nozzle or the electrode. The high-frequency coil generator is of well known, conventional construction, as is the DC power supply. A typical high voltages produced by the coil/generator 22 are in the range typically 5,000 volts at frequencies in the range of 2 to 3 mHz.

During operation, a flow 24 of an ionizable gas is initiated through an electrode-nozzle chamber 25 exiting the torch through an exit port 44 in the lower face of the nozzle. It assumes a swirling flow path **24*a* between the lower end of the electrode and the nozzle just before it exits port 44 in the nozzle. When high frequency is applied to the system via the coil 22, a high level oscillating electric field will be generated between the electrode 14 and the nozzle 12**.

A significant aspect of the present invention is that the interior surface 26 of the nozzle has circumferentially extending (closed loop) projection or peak which is termed herein an angle kink 28. It is significant this angle kink 28 is located at the point of closest spacing between the nozzle 12 and the electrode 14, and represents a line of localized minimum gap separation between the electrode and the nozzle—as compared, for example, to prior art constructions where the corner associated with the nozzle exit port may have a minimum radius of curvature, but is no closer to the electrode than adjacent portions of the surface. It has been found that this construction reduces the breakdown voltage between a narrow annular region 30 centered on the angle kink 28 and a narrow annular region 32 centered on an electrode angle kink 34. The electrode 14 has a conical tapered end surface 36 and a planar end face 38 oriented perpendicular to a common longitudinal axis 40 of the torch, the nozzle 12, and the electrode 14. The intersection of the surface 36 and the end face 38 defines the angle kink 34. The intersection of conical surface **26*a* (having an angle A of inclination of about 45° from the axis 40, as shown) and conical surface 26*b* (having an angle B of inclination of about 60° from the axis 40, as shown) defines the angle kink 28. In the preferred form shown, the angle kink therefore has an included angle of 165° and has a line intersection which is not rounded. The angle kinks 28 and 34 and their associated regions 30 and 32 are separated by a gap 42 in an electrode-nozzle chamber 25. While the angle kink 28 and 34** are shown as being directly opposite one another, and this is the preferred embodiment, such a precise opposite alignment is not essential to the operation of this invention.

It should be noted that the gap 42 between the angle kinks 28 and 34 is the point of closest spacing between the nozzle and the electrode, at least in the region immediately adjacent the angle kinks. As a result, the application of the high frequency to the nozzle 12 over the positive lead 18 concentrates the electric field strength at the nozzle angle kink 28 and provides a reliable breakdown in the zone between the annular regions 30 and 32. It is also significant that the angle kink 28 formed on the interior 36 of the nozzle has a minimum radius of curvature as compared to the radius of curvature of the adjoining portions of the surface so as to create a protrusion which produces the electric field enhancement discussed above. Similarly, the angle kink 34 on the electrode should have the smallest radius in the immediate region adjoining the point of closest spacing between the electrode and the nozzle at the gap 42.

If the high frequency coil 22 is attached to the negative lead 20 of the DC power supply, the breakdown voltage can be reduced between the annular regions 32 and 30 with respect to the remainder of the electrode-nozzle chamber 25. Further, by providing an angle kink 34 on the electrode and an angle kink 28 on the nozzle that are each characterized by a minimum radius of curvature, then there will be a strong electric field enhancement that the electrode angle kink 34 which tends to concentrate the electric field strength between the annular regions 30 and 32. This enhanced field strength in turn both assures that breakdown will occur between the zones across the gap 42 and that the breakdown potential will be reduced as compared to the potential required if the nozzle 12 had a simple conical configuration as depicted in FIG. 3.

Figure 4:
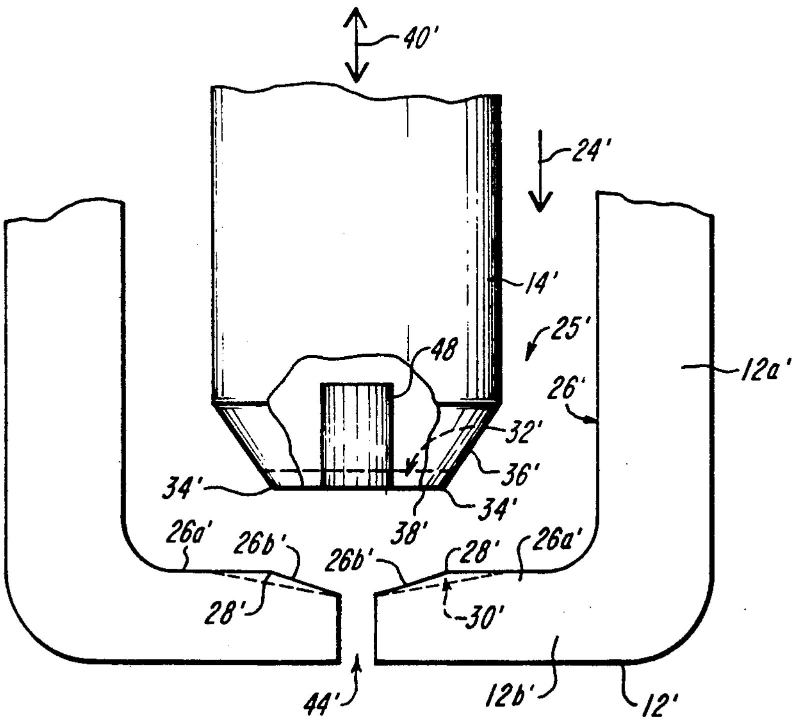
FIG. 4 is a view corresponding to FIG. 2 of an alternative nozzle construction according to the present invention.

FIG. 4 illustrates alternative embodiment of the present invention where the nozzle has a generally cylindrical interior configuration formed by a cylindrical side wall 12*a*′ and a lower end wall 12*b*′ that includes the exit port 44′ (like parts being identified with the same reference number in the different embodiments). Again, the nozzle 12′ is spaced symmetrically from the electrode 14′. The nozzle end wall 12*b*′ is spaced closer to the opposite surface of the electrode than the side wall 12*a*′.

An angle kink 28 is formed on the inner surface 26′ of the nozzle by the intersection of the generally planar inner surface portion 26*a*′ defining the end wall 12*b*′ and a conical surface 26*b*′ extending between the exit port 44 and the inner surface portion 26*a*′. The conical surface 26*b*′ is typically inclined at about 10° from the plane of the surface portion 26*b*′. The angle kink 28′ is located at a point of closest spacing from the electrode 14′, and preferably directly opposite an angle kink 34′ formed on the lower end of the electrode. As shown, the angle kink 34′ is the circumferentially extending solid angle defined by the intersection of a conical surface 36′ and an end surface 38′. The electrode 14′ has a cylindrical electron emitting insert 48 at the center of its lower end face 38′, directly opposite the exit port 44.

The angle kinks 28′ and 32′ are centered in narrow annular regions 30′, 32′ which define a zone in which the plasma arc discharge will preferentially occur. The gap 42′ between the angle kinks 28′ and 34′ is a point of closest approach.

In operation, the nozzle construction of the present invention, when used with a 200 ampere plasma torch of the type sold by Hypertherm, Inc. under the trade designation MAX 200, reduced the maximum breakdown potential by as much as 10% and reduced electrode wear by as much as 30%. Comparable reductions have been obtained with other torches under standard operating conditions. Moreover, the pilot arc discharge has been found to occur preferentially and reliably within a zone defined at its ends by the annular regions 30 and 32.

While the invention has been described with respect to its preferred embodiments, it will be understood that various modifications and alterations will occur to those skilled in the art from the foregoing detailed description and the accompanying drawings. For example, while the angle kink on the nozzle has been described as formed by the intersection of combinations of conical and planar surfaces, it may be formed with a rounded cross-section, a rounded cross-section with a circumferentially extending ridge at its "peak", or a variety of other configurations which produce a protrusion with a minimum radius of curvature, in cross section, located at a point of closest spacing to the opposed cathode, or anode, and with this closest spacing being a localized point of minimum spacing. Also, while the angle kinks have been described and illustrated for the nozzle and electrode as being circumferentially extending, they could be formed to extend in angular displacement over less than 360° about the axis 40. These and other modifications and alterations are intended to fall within the scope of the appended claims.

What is claimed is:

1. In a plasma arc torch having a longitudinal axis, said torch operating in a transferred arc mode on a workpiece, said torch initiated first in a pilot arc mode, having an electrode and a nozzle formed of a conductive material mounted at one end of the torch in a symmetrical spaced relationship with respect to one another and the longitudinal axis, said electrode having a generally cylindrical configuration and a lower end surface that is generally transverse to said longitudinal axis, a flow of an ionizable gas through said spacing and exiting at a central exit port formed in the nozzle opposite said end surface, and a high-frequency, high-voltage signal applied to one of said electrode and said nozzle to initiate the plasma arc discharge in the gas, the improvement comprising said nozzle having an inner surface facing said electrode located adjacent said exit port, and having an angle kink formed therein, said angle kink 1) having a minimum convex radius of curvature as compared to the radius of curvature of adjacent portions of said inner surface and 2) being positioned at a point of minimum spacing between said electrode and said nozzle, whereby said angle kink enhances the electric field strength produced by said high-frequency, high-voltage signal when said high voltage signal is applied across said electrode and said nozzle to reduce the breakdown potential necessary to initiate said plasma arc discharge and reliably initiate the arc in a narrow annular region adjacent said angle kink, and said angle kink being spaced from said exit port so that said narrow annular region of arc initiation does not include an intersection of said inner nozzle surface with the central exit port.

2. The improvement of claim 1 wherein said angle kink extends continuously in a closed loop path oriented generally transverse to said longitudinal axis.

3. The improvement of claim 1 wherein said angle kink is formed by the intersection of a first conical surface and a second surface.

4. The improvement of claim 3 wherein said second surface is also conical, but has a different slope than said first conical surface with respect to the longitudinal axis.

5. The improvement of claim 3 wherein said electrode also has an angle kink projecting toward said nozzle at a position of closest approach between said nozzle and said electrode.

6. The improvement according to claim 5 wherein said angle kink on said electrode is located at a portion of said electrode that in normal operation experiences low wear and is adjacent, but spaced laterally from, the portion of said electrode immediately above said nozzle exit port.

7. The improvement according to claim 5 wherein said electrode angle kink and said nozzle angle kink are in an opposed spaced relationship at a point of minimum separation between said electrode and said nozzle.

8. A nozzle for a plasma arc torch that operates in a transferred arc mode on a workpiece where the nozzle acts in conjunction with an electrode mounted with the nozzle in a spaced relationship as one end of the torch to initiate a plasma arc discharge in a flow of ionizable gas passing between the electrode and the nozzle when a high voltage, high frequency signal is applied across said electrode and said nozzle, said electrode having a generally cylindrical configuration and a lower end surface that is generally transverse to the longitudinal axis of the electrode comprising a conductive member having a central exit port opposite said electrode end surface for the plasma arc when it attaches to the workpiece that is aligned with said electrode and a surface facing said electrode and adjacent said exit port that has a angle kink formed therein and located at a point of minimum spacing between said electrode and said nozzle to produce said pilot arc preferentially and reliably in the region of said angle kink and at a reduced breakdown potential, said angle kink being spaced from said exit port so that said region of preferred pilot arc production does not include an intersection of said nozzle surface with said central exit port.

9. The nozzle according to claim 8 wherein said angle kink is formed on said surface by the intersection of two conical surfaces of different angles of inclination as measured from the longitudinal axis of the torch.

10. In a plasma arc torch having a longitudinal axis, said torch operating in a transferred arc mode on a workpiece, said torch initiated first in a pilot arc mode, having an electrode and a nozzle formed of a conductive material and mounted at one end of the torch in a symmetrical spaced relationship with respect to one another and the longitudinal axis, a flow of an ionizable gas through said spacing and exiting at a central exit port formed in the nozzle, the electrode having a generally cylindrical configuration and having an end surface that is generally transverse to the longitudinal axis, and a high-frequency, high-voltage signal applied across said electrode and said nozzle to initiate the pilot plasma arc discharge in the gas, the improvement comprising said electrode and said nozzle having outer and inner surfaces, respectively facing one another across said spacing, said nozzle inner surface being located adjacent said exit port, and said inner and outer surfaces each having an angle kink formed therein, said angle kinks 1) having a minimum convex radius of curvature as compared to the radius of curvature of adjacent portions of said inner surface and 2) being positioned at a point of minimum spacing between said electrode and said nozzle, whereby said angle kinks enhance the electric field strength produced by said high-frequency, high-voltage signal when said high voltage signal is applied across said electrode and said nozzle to reduce the breakdown potential necessary to initiate said plasma arc discharge and reliably initiate the arc in narrow annular regions on said outer and inner surfaces adjacent said angle kinks, and said angle kink being spaced from said exit port so that said narrow annular region of arc initiation does not include an intersection of said inner nozzle surface with the central exit port.

* * * * *